US012612885B1

(12) United States Patent
Hunter

(10) Patent No.: US 12,612,885 B1
(45) Date of Patent: Apr. 28, 2026

(54) SYSTEM AND METHOD FOR CAPTURING AND UTILIZING FUGITIVE COMBUSTIBLE GASES DURING NATURAL GAS PRODUCTION

(71) Applicant: Oasis Emission Consultants, Inc., Rock Springs, WY (US)

(72) Inventor: Gregory Hunter, Castle Rock, CO (US)

(73) Assignee: Oasis Emission Consultants, Inc., Rock Springs, WY (US)

( * ) Notice: Subject to any disclaimer, the term of this patent is extended or adjusted under 35 U.S.C. 154(b) by 0 days.

(21) Appl. No.: 19/032,566

(22) Filed: Jan. 21, 2025

(51) Int. Cl.
*F02M 21/02* (2006.01)
*F02D 41/00* (2006.01)

(52) U.S. Cl.
CPC ..... *F02M 21/0227* (2013.01); *F02D 41/0045* (2013.01); *F02M 21/0215* (2013.01); *F02M 21/0218* (2013.01)

(58) Field of Classification Search
CPC ................ F02D 41/0045; F02M 21/02; F02M 21/0215; F02M 21/0218; F02M 21/0221; F02M 21/0224; F02M 21/0227
USPC .......................................... 123/518, 525–529
See application file for complete search history.

(56) References Cited

U.S. PATENT DOCUMENTS 6,340,005 B1 * 1/2002 Keast .................. F02D 41/0007 123/527
8,113,181 B2 2/2012 Malm
8,382,469 B2 2/2013 Malm
8,978,627 B2 3/2015 Malm
9,046,062 B2 6/2015 Tice
2011/0094593 A1 * 4/2011 Malm ................... F02D 19/081 123/434
2012/0180766 A1 * 7/2012 Malm ..................... F02B 43/10 123/518
2013/0074757 A1 * 3/2013 McAlister ................. C01B 3/24 422/187
2014/0116375 A1 * 5/2014 Kim ................... F02M 21/0278 123/456
2014/0134710 A1 * 5/2014 Grill .................. B01D 53/1462 435/283.1
2014/0174404 A1 * 6/2014 Coldren .............. F02D 19/0673 123/459

(Continued)

FOREIGN PATENT DOCUMENTS

CA 2601027 C 9/2006
CA 2703706 C 4/2009
CA 2868338 A1 * 12/2014 ......... F02D 41/0025

*Primary Examiner* — Erick R Solis
(74) *Attorney, Agent, or Firm* — Schell IP

(57) ABSTRACT

A system and method for capturing, monitoring, and utilizing fugitive combustible gases from natural gas compressors and engines. The system comprises collection points for capturing gases from multiple sources, a filtration system, a control valve, a programmable logic controller for monitoring and control, and an engine air intake system for utilizing the gases as supplementary fuel. Advanced safety features and comprehensive data logging capabilities are included. The invention reduces greenhouse gas emissions, improves fuel efficiency, and facilitates regulatory compliance in natural gas production facilities. It offers seamless integration with existing equipment and real-time performance optimization through a human-machine interface.

16 Claims, 8 Drawing Sheets

(56) References Cited

U.S. PATENT DOCUMENTS

| | | | | |
|---|---|---|---|---|
| 2015/0027931 | A1* | 1/2015 | Brodt | C10G 1/065 208/426 |
| 2015/0368566 | A1* | 12/2015 | Young | C10L 3/106 700/273 |
| 2017/0314513 | A1* | 11/2017 | Oversby | F02M 25/0854 |
| 2019/0170436 | A1* | 6/2019 | De | F25J 3/062 |
| 2023/0058457 | A1* | 2/2023 | Graney, IV | B01D 53/226 |
| 2023/0313659 | A1* | 10/2023 | Graney, IV | E21B 43/35 166/227 |
| 2024/0255141 | A1* | 8/2024 | Mørch Sørensen | F23G 7/065 |
| 2024/0399288 | A1* | 12/2024 | Nazimek | B01D 53/18 |
| 2025/0085155 | A1* | 3/2025 | Maness | G01F 1/684 |

* cited by examiner

SYSTEM AND METHOD FOR CAPTURING AND UTILIZING FUGITIVE COMBUSTIBLE GASES DURING NATURAL GAS PRODUCTION

FIELD OF THE INVENTION

The invention relates to systems and methods for capturing, monitoring, and utilizing fugitive combustible gases from natural gas production and compression facilities to reduce greenhouse gas emissions and improve operational efficiency.

BACKGROUND OF THE INVENTION

Greenhouse gas emissions, particularly methane, from natural gas production facilities have become a significant environmental concern and regulatory focus in recent years. Fugitive emissions from various components of natural gas production and compression equipment contribute substantially to these emissions. Traditional methods of handling these emissions often involve venting or flaring, which not only wastes valuable resources but also exacerbates environmental impact.

The oil and gas industry faces increasing pressure to reduce methane emissions due to their potent greenhouse effect. Methane, the primary component of natural gas, has over twenty times greater greenhouse causing effects than carbon dioxide when released into the atmosphere. This has led to the implementation of stringent regulations aimed at curbing these emissions and promoting more sustainable practices within the industry.

Recent regulations, such as NSPS OOOO b/c and the Methane Emission Reduction Program (MERP), impose strict limits on methane emissions and financial penalties for excess emissions. These regulations cap the venting of natural gas at two standard cubic feet per minute per compressor throw, with anything above that subject to discharge fees. This regulatory landscape has created a pressing need for innovative solutions to capture, measure, and utilize fugitive gases effectively.

Furthermore, the Waste Emissions Charge (WEC) under the Inflation Reduction Act introduces escalating fees for methane emissions. The WEC is set to increase from $900 per metric ton of methane in 2024 to $1,200 per metric ton in 2025, and further to $1,500 per metric ton in 2026. This financial incentive structure underscores the urgency for companies to implement robust emission control and monitoring systems. Prior attempts to address this issue have had limitations.

For example, U.S. Pat. No. 8,382,469 to Malm ("Malm"), hereby incorporated by reference in its entirety, discloses a method for introducing fugitive combustible gases to a natural gas engine. While this system aims to utilize fugitive gases as a supplementary fuel source, it lacks comprehensive safety features and sophisticated control mechanisms. The disclosed invention within Malm provides only for manual control and does not provide real-time monitoring or data logging capabilities essential for regulatory compliance and performance optimization.

Similarly, U.S. Pat. No. 9,046,062 to Tice ("Tice"), hereby incorporated by reference in its entirety, presents a greenhouse gas capture system. However, this system focuses primarily on capturing and routing fugitive gases without addressing the complexities of integrating these gases into the engine's fuel system or providing detailed emissions tracking.

Both Malm and Tice fail to adequately address the increasing regulatory requirements related to methane emissions in the oil and gas industry. Recent regulations, such as NSPS OOOO b/c and the Methane Emission Reduction Program (MERP), impose strict limits on methane emissions and financial penalties for excess emissions. Furthermore, the Waste Emissions Charge (WEC) under the Inflation Reduction Act introduces escalating fees for methane emissions, creating a pressing need for more effective emission control and monitoring solutions.

The limitations of existing solutions highlight the need for a more comprehensive approach to fugitive gas management. Current systems often lack the integration capabilities necessary to seamlessly incorporate captured gases into existing engine operations. They also frequently fall short in providing the level of monitoring and data analysis required for effective emissions reduction and regulatory compliance.

Moreover, safety considerations are paramount in any system dealing with combustible gases. Many existing solutions do not incorporate robust safety features to protect against potential system failures or abnormal operating conditions. This gap in safety measures poses risks to both equipment and personnel, underscoring the need for a more holistic approach to fugitive gas management.

There is a need for a comprehensive system that not only captures and utilizes fugitive gases but also provides advanced control, monitoring, and reporting capabilities to ensure regulatory compliance and optimize operational efficiency. Such a system should integrate seamlessly with existing equipment, offer robust safety features, and provide detailed, real-time data on emissions and system performance.

SUMMARY OF THE INVENTION

The present invention relates to a system and method for capturing, monitoring, and utilizing fugitive combustible gases, primarily methane, from natural gas compressors and engines. This innovative system addresses the critical issue of greenhouse gas emissions in the oil and gas industry while simultaneously improving fuel efficiency and operational performance. The invention comprises a network of collection points strategically located throughout a facility to capture fugitive gases from multiple sources, including compressor cylinder packings, engine crankcases, instrumentation vents, gas dehydration units, and petroleum liquid storage tanks. These captured gases undergo a filtration and processing stage to remove contaminants and ensure they are suitable for use as a supplementary fuel source.

At the core of the system is a sophisticated control and monitoring setup, employing a combination of flow meters, pressure sensors, control valves, and a programmable logic controller (PLC). This system continuously monitors gas flow rates, pressures, and engine parameters to optimize performance and ensure safe operation. A human-machine interface (HMI) provides operators with real-time data and control capabilities, enhancing overall system management and efficiency.

Safety is a paramount consideration in the design of this system. Multiple safeguards are incorporated to protect against potential failures, including overpressurization scenarios and engine malfunctions. These safety features include primary and secondary pressure relief valves, pressure transmitters to detect packing failures, and automatic shutdown mechanisms. These safety measures work in tandem with the control system to provide a robust and reliable solution for fugitive gas mitigation.

Furthermore, the invention in an embodiment includes comprehensive data logging and reporting capabilities. This feature not only aids in regulatory compliance by providing accurate emissions data but also enables ongoing system optimization and performance analysis. The system integrates these components to effectively capture fugitive gases, process them, and introduce them into the engine's air intake system as a supplementary fuel source.

The invention offers significant advantages, including a substantial reduction in methane emissions, which addresses environmental concerns and regulatory requirements. It improves fuel efficiency and energy recovery, leading to operational cost savings. The advanced control and monitoring capabilities allow for precise management of the system and real-time performance optimization. The robust safety features protect equipment and personnel from potential system failures or abnormal operating conditions.

The detailed data logging and reporting functions facilitate regulatory compliance and enable continuous improvement of system performance. Additionally, the system's adaptability and ease of integration with existing equipment make it suitable for a wide range of facility configurations. This invention represents a comprehensive solution to the challenges of fugitive gas emissions in natural gas production facilities, offering environmental, operational, and regulatory benefits that surpass existing technologies in the field.

DETAILED DESCRIPTION

The present invention relates to a system and method for capturing, monitoring, and utilizing fugitive combustible gases, primarily methane, from natural gas compressors and engines. This innovative system addresses the critical issue of greenhouse gas emissions in the oil and gas industry while simultaneously improving fuel efficiency and operational performance.

Figure 1:
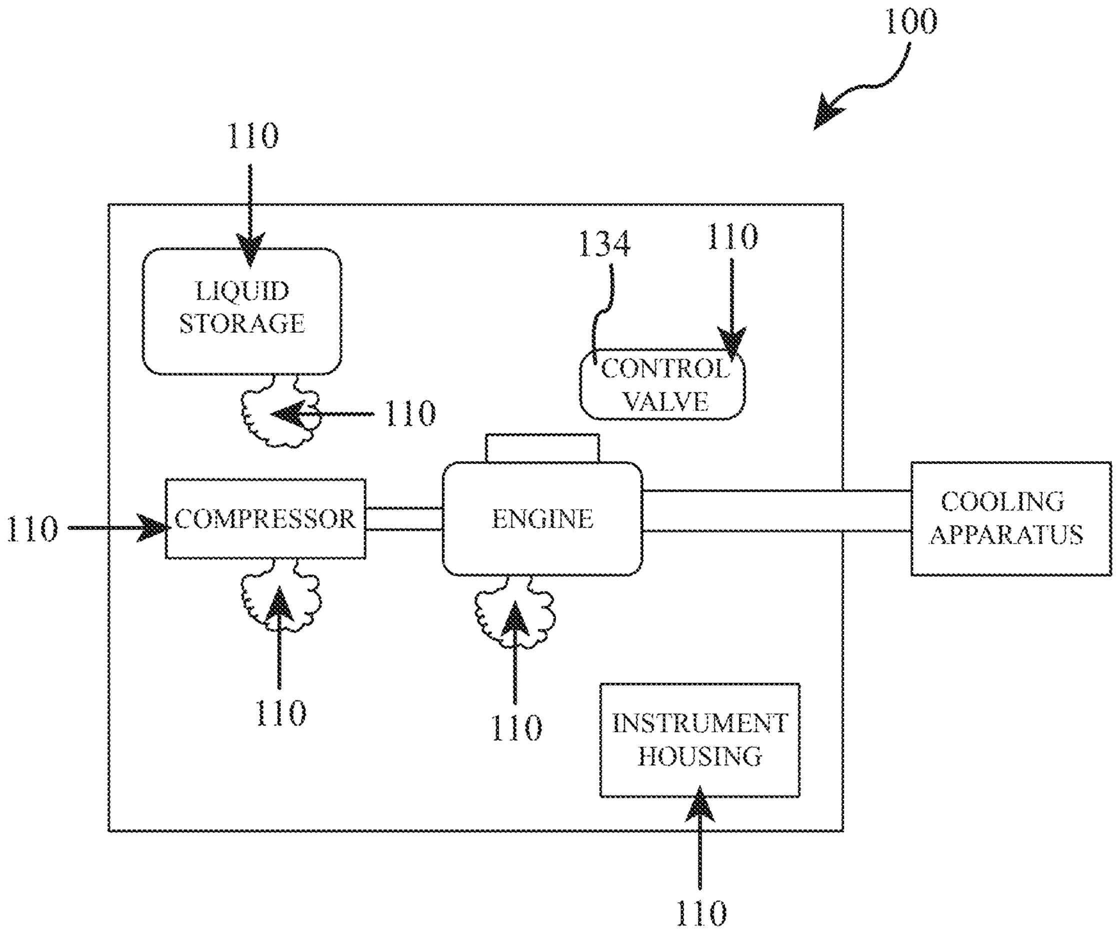
FIG. 1 is a diagrammatic view of a greenhouse gas capture system according to an exemplary embodiment.

As shown in FIGS. 1-8, the preferred embodiment comprises an overall vent gas capture system 100 that includes multiple integrated subsystems working together to capture, process, and utilize fugitive gases. FIG. 1 illustrates the system overview in accordance with the preferred embodiment, showing strategically placed gas collection points 110 positioned throughout the facility to capture emissions from various sources including compressor packings, engine crankcases, and instrumentation vents.

Figure 2:
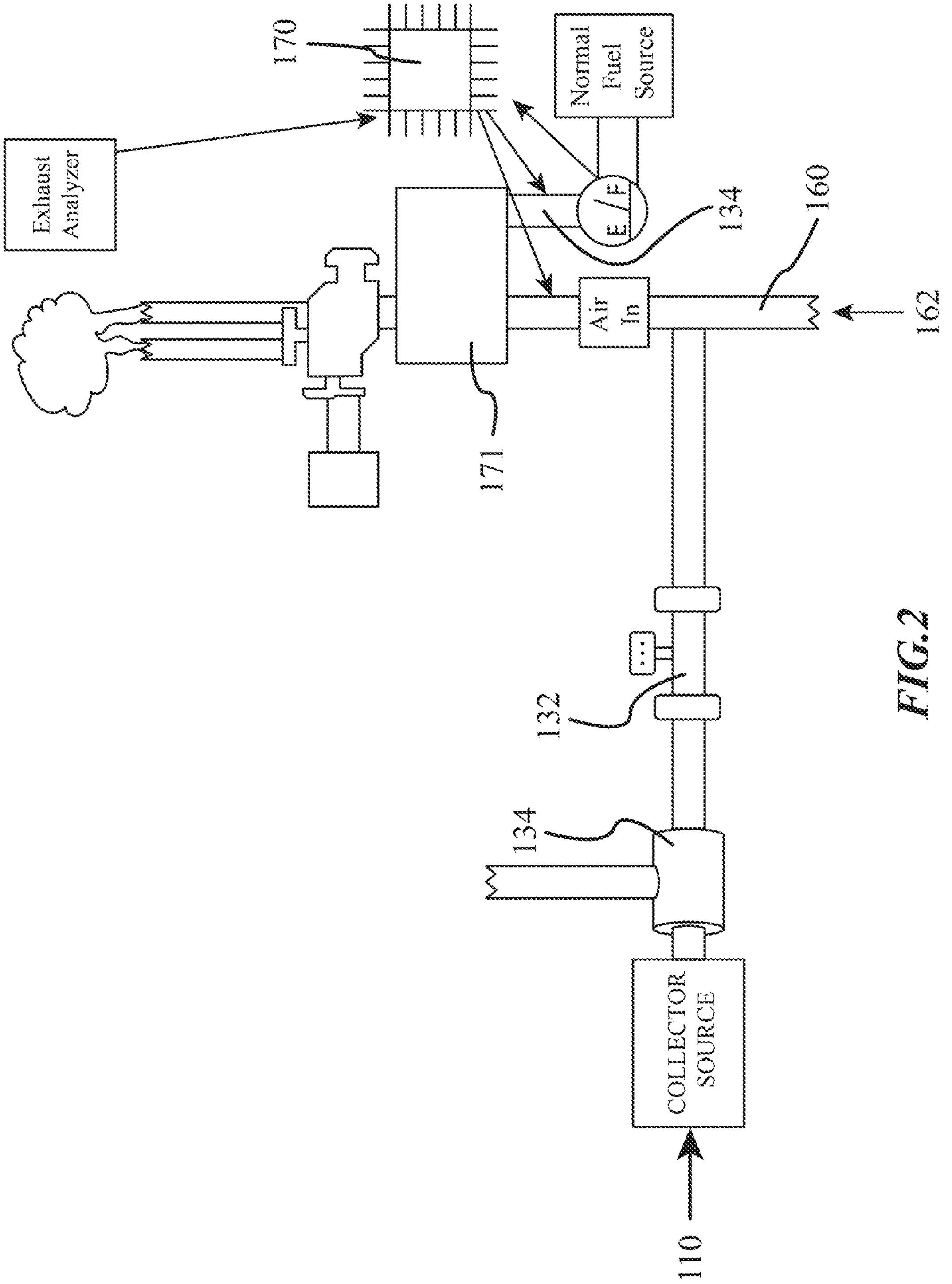
FIG. 2 is a diagrammatic illustration showing the collection points for capturing fugitive gases from multiple sources within a natural gas production facility according to an exemplary embodiment.
Figure 3:
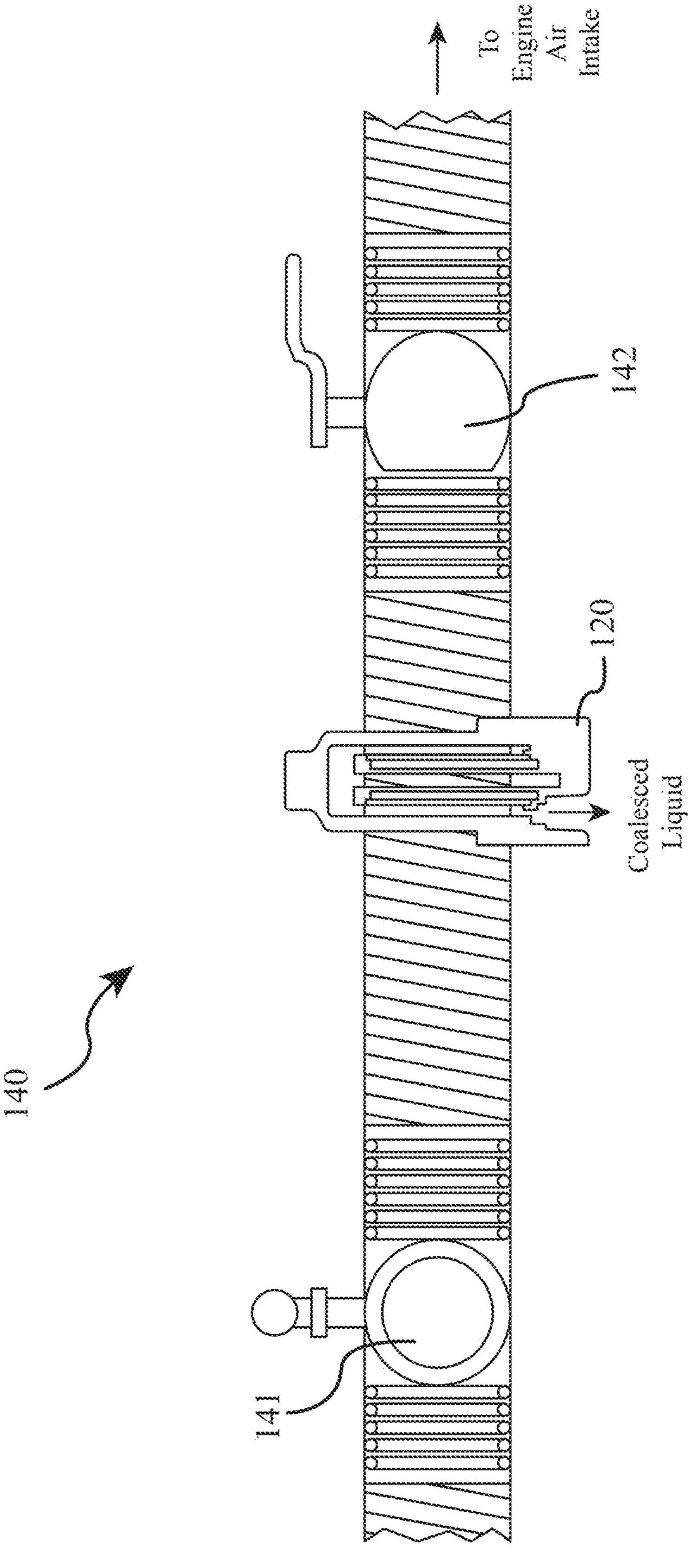
FIG. 3 is a detailed cross-sectional view of the filtration system showing the coalescing filter and associated components according to an exemplary embodiment.

FIG. 2 depicts the filtration system 120 in accordance with the preferred embodiment which incorporates a coalescing filter designed to remove oil and other contaminants. The filtration system 120 includes isolation ball valves on either side to enable maintenance without system shutdown. The filtered gases then flow to the control system components 130, which include a programmable logic controller (PLC) 131, flow meters 132, pressure sensors 133, and control valves 134. FIG. 3 shows the detailed cross-section of the filtration system 120 in accordance with the preferred embodiment and its components.

Figure 4:
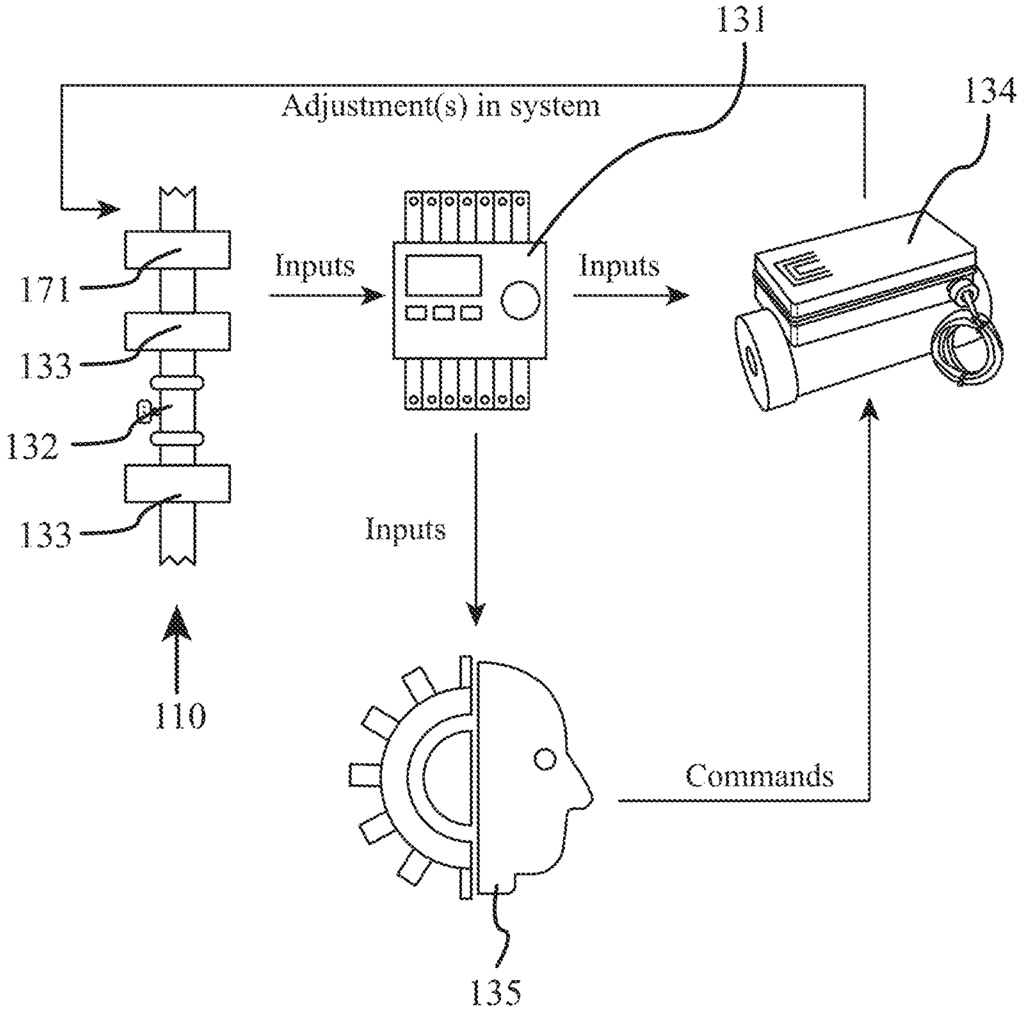
FIG. 4 is a flowchart illustration of the control system showing the interaction between the PLC, sensors, and control components according to an exemplary embodiment.

FIG. 4 illustrates the control system architecture in accordance with the preferred embodiment, including the human-machine interface (HMI) 135 that provides operators with real-time monitoring and control capabilities. The safety system components 140, shown in FIG. 5, in accordance with the preferred embodiment incorporates primary pressure relief valve 141 set at 250 psi and secondary pressure relief valve 142 set at 500 psi. Pressure transmitters 143 are strategically placed to detect packing failures, while automatic shutdown mechanisms 144 protect against high-pressure scenarios.

The preferred embodiment integrates various components to effectively capture, process, and utilize fugitive combustible gases, as depicted by FIG. 1. The filtration system 120 incorporates a coalescing filter designed to remove oil and other contaminants from the gas stream. Ball valves are installed on either side of the filtration system 120, enabling isolation of the unit for maintenance without interrupting engine operation. The control system architecture includes a programmable logic controller (PLC) 131 that continuously monitors and adjusts the system based on inputs from various sensors. Flow meters 132 measure the rate of gas flow at critical points in the system, while pressure sensors 133 monitor gas pressures throughout the process. Control valves 134, including the smart control valve, play a critical role in regulating gas flow and pressure, receiving commands from the PLC 131 to adjust their positions. The human-machine interface (HMI) 135 serves as the primary point of interaction between operators and the control system, displaying real-time data on system performance and allowing operators to input commands and adjust system parameters as needed. This integrated control system ensures precise management of the captured gases while maintaining optimal performance and safety parameters.

Figure 5:
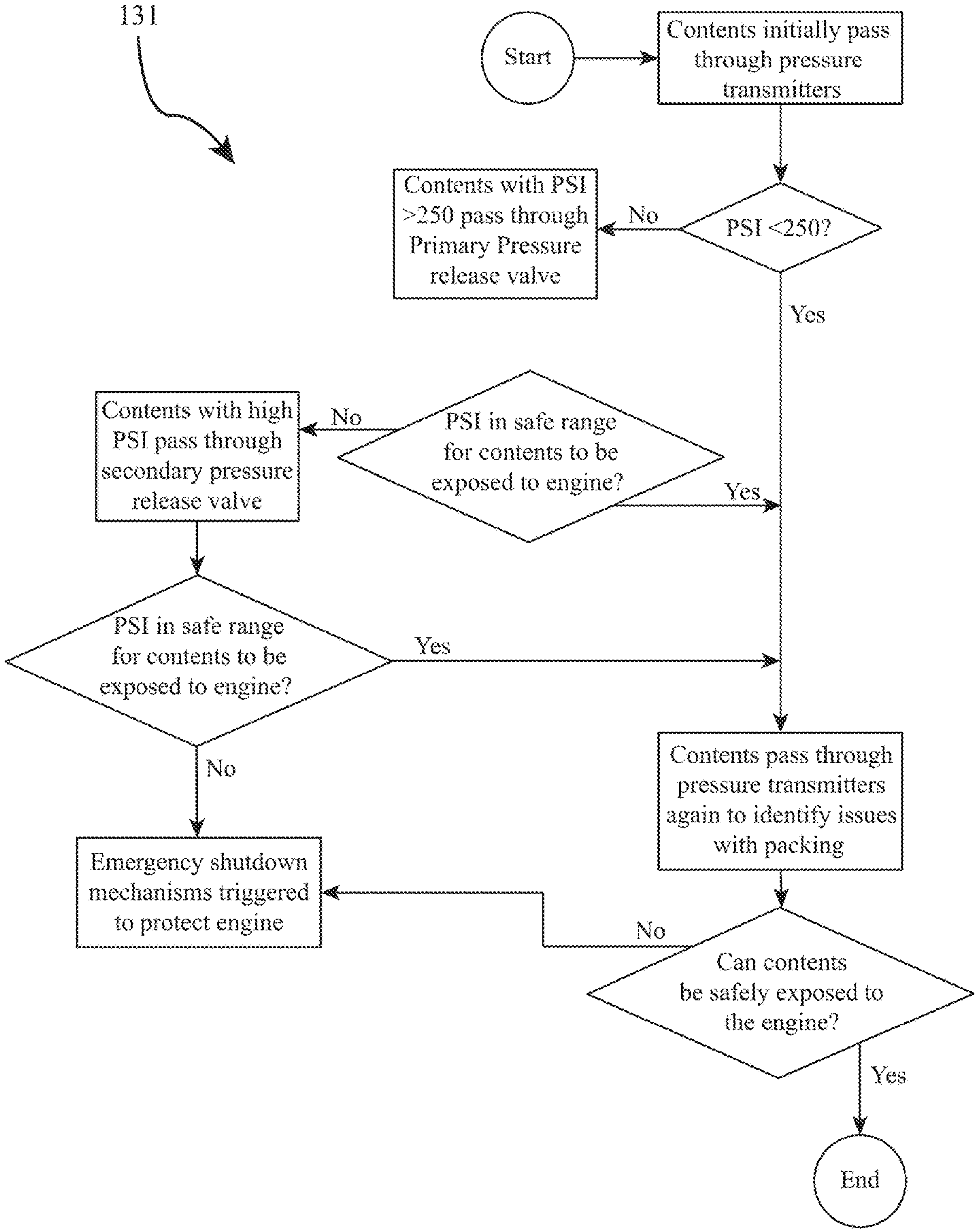
FIG. 5 is a schematic diagram of the safety systems showing the primary and secondary pressure relief valves and associated safety components according to an exemplary embodiment.

The safety system components 140 in accordance with the preferred embodiment provide comprehensive protection against system failures and abnormal operating conditions, as illustrated in FIG. 5. The primary pressure relief valve 141 is set to activate at 250 psi, serving as the first line of defense against overpressurization, while the secondary pressure relief valve 142 provides redundant protection with a higher threshold of 500 psi. Pressure transmitters 143 are strategically positioned throughout the system to continuously monitor pressure levels, particularly around compressor cylinder packings where leaks are most likely to occur. These transmitters enable early detection of packing failures by comparing pressure readings from different locations. The automatic shutdown mechanisms 144 are designed to rapidly halt system operation if pressure levels exceed predetermined safety thresholds, protecting both equipment and personnel. When a pressure anomaly is detected by the pressure transmitters 143, the system triggers an alarm to the control panel, allowing the controller to initiate a controlled shutdown sequence through the automatic shutdown mechanisms 144. This integrated safety system ensures multiple layers of protection against potential system failures while maintaining operational integrity.

Figure 6:
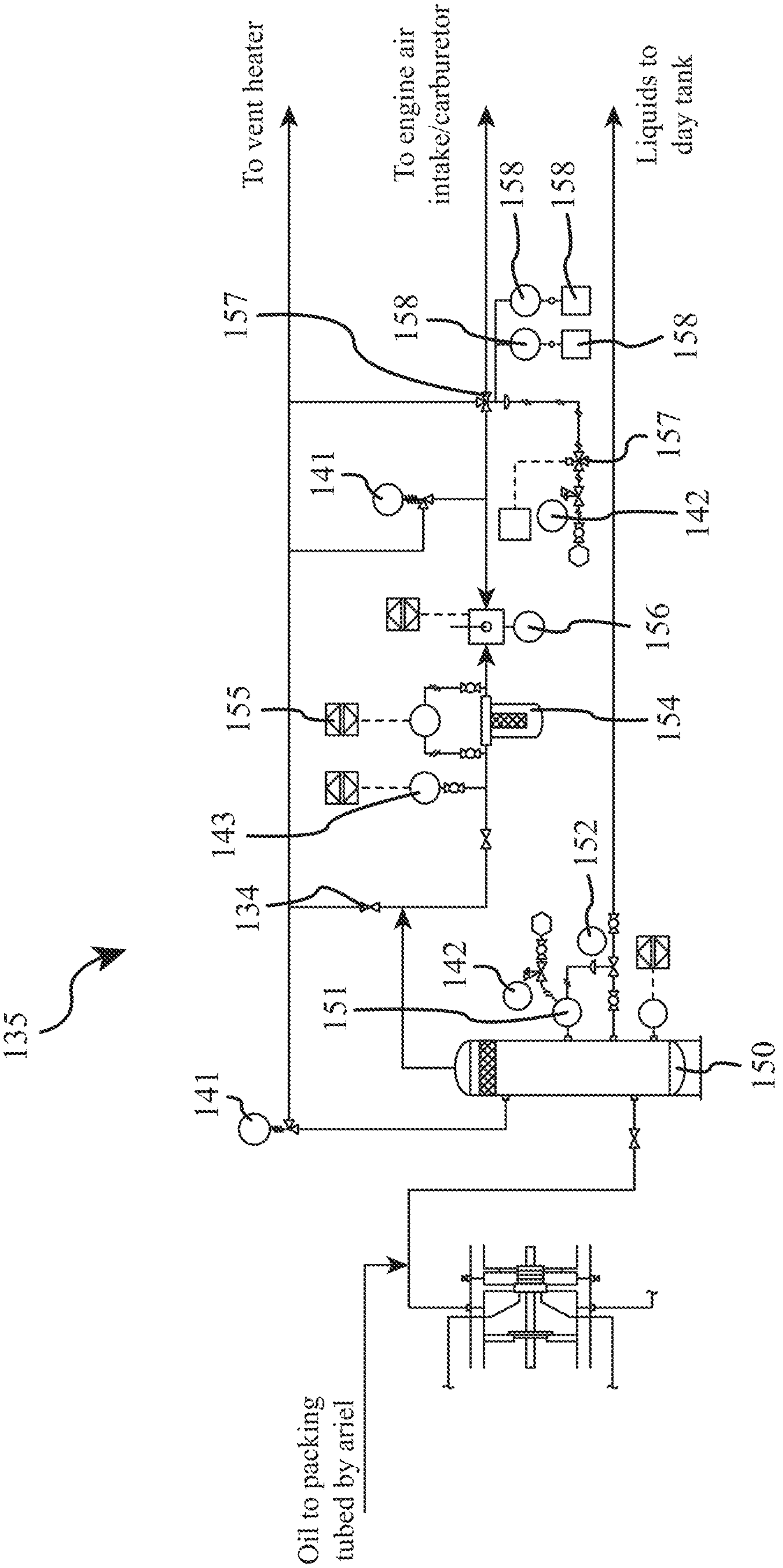
FIG. 6 is a representation of the human-machine interface (HMI) screen showing system performance data and control options according to an exemplary embodiment.

As depicted in FIG. 6, the gas accumulator 150 in accordance with the preferred embodiment collects gas from compressor rod packings and incorporates level control 151 and level control valve 152 to manage liquid separation. Pressure transmitter 153 monitors gas pressure before the stream passes through filter 154. Differential pressure transmitter 155 and flow meter 156 provide crucial monitoring data to the control system. The three-way flow control valve 157 directs gas flow either to the engine or vent, with valve status indicators 158 tracking the flow direction.

Figure 7:
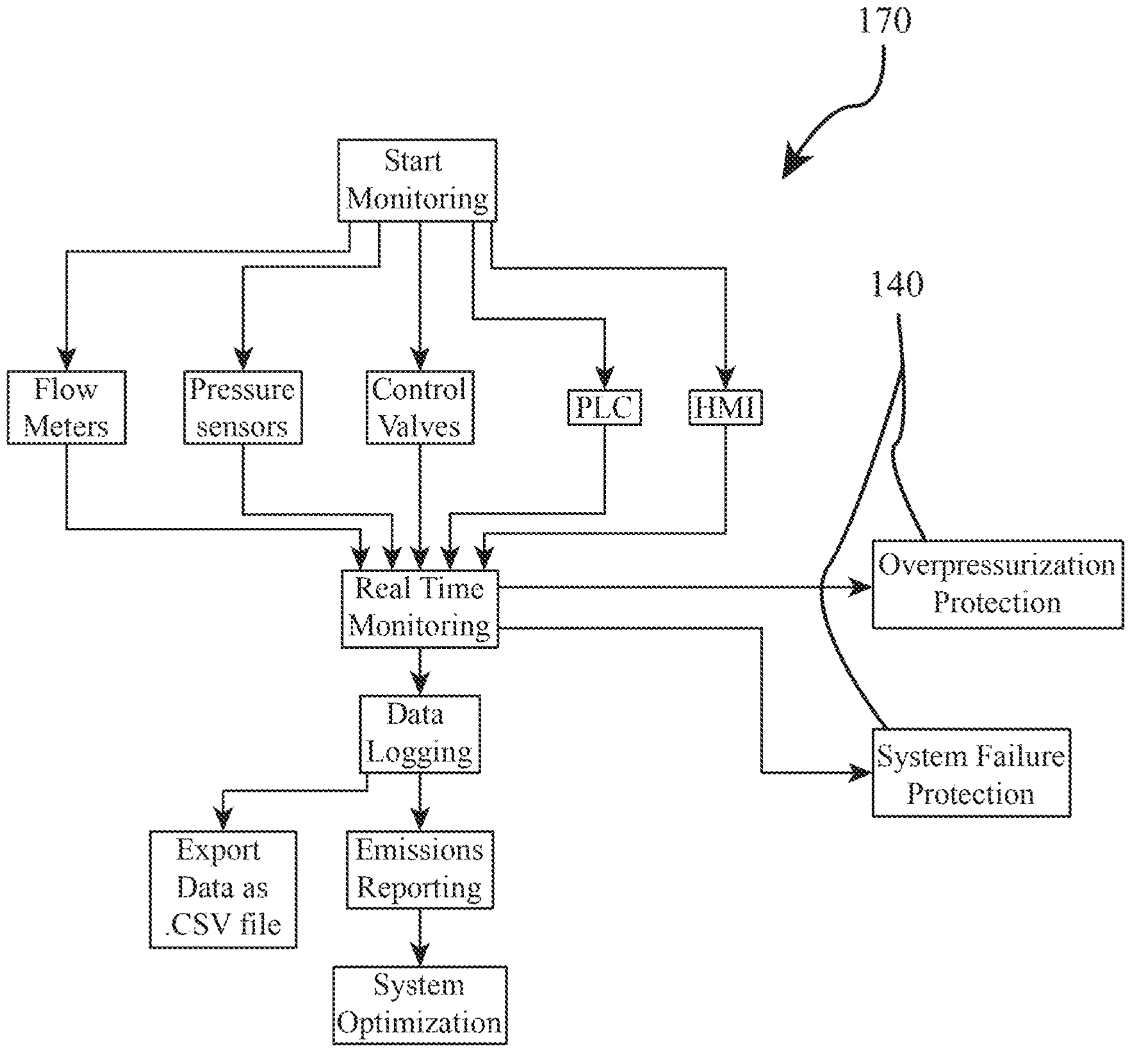
FIG. 7 is a block diagram of the data logging and reporting system showing the flow of information from sensors to storage according to an exemplary embodiment.

FIG. 7 shows the engine air intake components 160 in accordance with the preferred embodiment, including a dynamic mixing nozzle 161 specifically designed to enhance fuel mixing at the insertion points 162. This configuration ensures optimal mixing of the fugitive gases with the engine's intake air.

Figure 8:
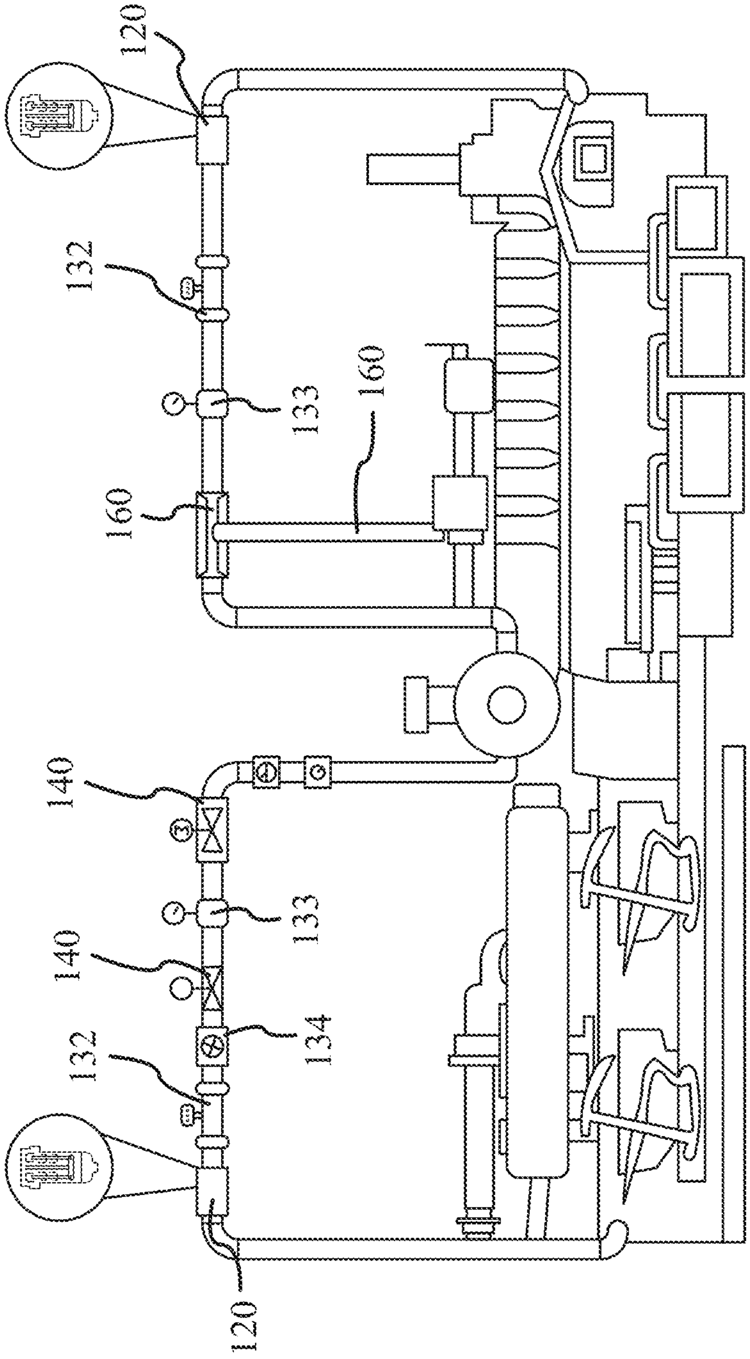
FIG. 8 demonstrates the integration of the system components with existing engine and compressor equipment in a typical industrial environment according to an exemplary embodiment.

FIG. 8 illustrates aspects of the data logging system 170 in accordance with the preferred embodiment, which incorporates data collection sensors 171 throughout the system, feeding information to the data processing unit 172. This processed data is stored in the data storage system 173, enabling comprehensive emissions tracking and regulatory compliance reporting. The figure demonstrates how these components integrate with existing facility infrastructure.

In typical natural gas production and compression facilities, various components and processes result in the unintentional release of combustible gases into the atmosphere. These fugitive emissions not only represent a loss of valuable fuel but also contribute significantly to environmental concerns due to methane's potent greenhouse effect. The preferred embodiment of the present invention provides a comprehensive solution to mitigate these issues by collecting, processing, and repurposing these otherwise wasted gases.

The system comprises several key components and subsystems working in concert to achieve its objectives. At its core, the invention includes a network of collection points strategically located throughout a facility to capture fugitive gases from multiple sources. These sources may include, but are not limited to, compressor cylinder packings, engine crankcases, instrumentation vents, gas dehydration units, and petroleum liquid storage tanks.

Once collected, the fugitive gases undergo a filtration and processing stage to remove contaminants and ensure the gas is suitable for use as a supplementary fuel source. This processed gas is then carefully introduced into the engine's air intake system, effectively recycling what would otherwise be wasted emissions back into the combustion process.

A sophisticated control and monitoring system forms the backbone of the invention, employing a combination of flow meters, pressure sensors, control valves, and a programmable logic controller (PLC). This system continuously monitors gas flow rates, pressures, and engine parameters to optimize performance and ensure safe operation. A human-machine interface (HMI) provides operators with real-time data and control capabilities, enhancing overall system management and efficiency.

Safety is a paramount consideration in the design of this system. Multiple safeguards are incorporated to protect against potential failures, including overpressurization scenarios and engine malfunctions. These safety features work in tandem with the control system to provide a robust and reliable solution for fugitive gas mitigation.

Furthermore, the invention in the preferred embodiment includes comprehensive data logging and reporting capabilities. This feature not only aids in regulatory compliance by providing accurate emissions data but also enables ongoing system optimization and performance analysis.

The following detailed description will elaborate on each component of the system, their interactions, and the overall operation of the invention. Reference will be made to the accompanying drawings, which provide visual representations of the system's layout, individual components, and key processes.

The preferred embodiment integrates various components to capture, process, and utilize fugitive combustible gases effectively, as depicted by FIG. 1. The system's design incorporates multiple gas collection points, filtration units, control valves, safety devices, and connections to the engine air intake, working in concert to mitigate greenhouse gas emissions and improve fuel efficiency.

Multiple gas collection points are strategically positioned throughout the facility to capture fugitive gases from various sources. These collection points include compressor cylinder packings, engine crankcases, instrumentation vents, gas dehydration units, and petroleum liquid storage tanks. Each collection point is equipped with appropriate ducting and piping to route the captured gases to a central collection system. This comprehensive approach ensures that a wide range of potential emission sources are addressed, maximizing the system's effectiveness in reducing overall greenhouse gas emissions.

Filtration units play a crucial role in processing the collected fugitive gases. The system employs a coalescing filter designed to remove oil and other contaminants from the gas stream. This filtration process is essential to ensure the quality and purity of the gas before it is introduced into the engine air intake. The filter is designed for easy accessibility, allowing for efficient maintenance and replacement. Ball valves are installed on either side of the filter, enabling isolation of the filtration unit without interrupting engine operation. This design feature ensures continuous system operation even during filter maintenance or replacement.

Control valves are integral to managing the flow and pressure of the fugitive gases within the system. A key component is the smart control valve, which maintains the desired pressure of the fugitive gases entering the engine. This valve works in conjunction with a programmable logic controller (PLC) that continuously monitors and adjusts the system based on inputs from various sensors. The control valves enable precise regulation of the gas flow, ensuring optimal mixing with the engine's air intake and maintaining proper fuel-air ratios for efficient combustion.

An exemplary embodiment further comprises a comprehensive vent gas capture control system for managing and monitoring fugitive gases. In an example, an accumulator collects gas from the rod packing distance piece section of the compressor cylinders. Free liquid, which is typically lube oil, from this gas is separated in the accumulator. When a high level is detected by an associated level control device, the liquid is automatically dumped to the lube oil day tank through the opening of the level control valve.

The gas accumulator 150 in accordance with an embodiment serves as a critical component in the vent gas capture control system, collecting gas from the rod packing distance piece section of the compressor cylinders. Free liquid, typically lube oil, is separated within the gas accumulator 150, and when a high level is detected by level control 151, the liquid is automatically dumped to the lube oil day tank through the opening of level control valve 152.

Gas from the accumulator 150 in accordance with an embodiment undergoes pressure measurement via pressure transmitter 153 before being processed through filter 154. The differential pressure transmitter 155 measures and transmits the pressure differential across filter 154 to the local control panel. The volume of collected gas is measured using flow meter 156, with the volume data transmitted to the control system for monitoring and analysis.

The cleaned and metered gas then passes to the three-way flow control valve 157 in accordance with an embodiment, which directs the flow either to the engine for combustion as fuel or to vent. The control system is programmed with specific logic to actuate the three-way flow control valve 157 based on predetermined conditions, including engine RPM and vent gas header pressure reaching desired levels. The status of valve 157 is continuously monitored through valve status indicators 158, with the system calculating the volume of vent gas burned based on the flow rate and valve position. When valve 157 is open, the gas is utilized as fuel, and when closed, the gas is vented.

The system in an embodiment maintains comprehensive monitoring through various input/output components, including an accumulator level switch, a pressure transmitter, a filter, a differential pressure Transmitter, a mass flow meter, a shutdown valve solenoid, and shutdown valve status indicators.

The status of the three-way valve is continuously recorded through shutdown valve status indicators, with the system calculating the volume of vent gas burned based on the flow rate recorded via a mass flow meter and the valve status. When the valve is open, in accordance with an embodiment the gas is utilized as fuel, and when closed, the gas is vented.

This control system integrates with the broader monitoring capabilities of the preferred embodiment, providing real-time data logging and reporting features that enable precise tracking of emissions and system performance. The data collected through this control system contributes to the comprehensive emissions monitoring and regulatory compliance capabilities of the overall system.

Safety devices are incorporated throughout the system to protect against potential failures and abnormal operating conditions. These include primary and secondary pressure relief valves, set at 5 psi and 150 psi respectively, to prevent overpressurization. Pressure transmitters are installed to detect and locate packing failures, providing early warning of potential issues. The system also includes automatic shutdown mechanisms triggered by high-pressure scenarios. These safety features work in tandem to protect the engine and compressor from damage due to system failures or abnormal operating conditions, ensuring the overall reliability and longevity of the system.

The engine air intake components 160 in an embodiment introduce the processed fugitive gases into the engine's combustion system effectively. The cleaned gases are introduced into the engine's air intake through a dynamic mixing nozzle 161 specifically designed to enhance fuel mixing at the insertion point 162. This nozzle ensures proper mixing and distribution of the gases with the incoming air, creating an optimized diluted fuel mixture. The dynamic mixing nozzle 161 is engineered to maintain optimal engine performance while utilizing the captured emissions as a supplementary fuel source. The integration of these components with the engine air intake system 160 is designed to be seamless, allowing for easy retrofitting of existing engine systems without significant modifications.

The collection of fugitive gases from multiple sources within a natural gas production facility is a critical aspect of the system in the context of the invention. This comprehensive approach to gas collection addresses a significant environmental and regulatory challenge faced by the oil and gas industry.

The criticality of this aspect of an embodiment of the invention lies in its ability to capture a wide range of fugitive emissions that would otherwise be released into the atmosphere. By targeting multiple sources such as compressor cylinder packings, engine crankcases, instrumentation vents, gas dehydration units, and petroleum liquid storage tanks, the system maximizes its effectiveness in reducing overall greenhouse gas emissions.

This multi-source collection approach is particularly critical given the stringent regulations surrounding methane emissions in the oil and gas sector. The system directly addresses compliance with regulations such as NSPS OOOO b/c and the Methane Emission Reduction Program (MERP), which place limits on methane emissions and impose costs on excess emissions.

Furthermore, the comprehensive collection of fugitive gases enables the system to transform what would typically be wasted emissions into a valuable fuel source. By capturing these gases and reintroducing them into the engine's air intake, the system not only reduces environmental impact but also improves fuel efficiency and operational performance of the facility.

The criticality of this aspect is further emphasized by its role in enabling accurate monitoring and reporting of emissions. By collecting gases from multiple sources, the system provides a more complete picture of the facility's emissions profile, which is essential for regulatory compliance and for optimizing the facility's environmental performance.

As shown in FIG. 2, the system collects fugitive gases from several sources within a natural gas production facility. These sources include compressor cylinder packings, engine crankcases, instrumentation vents, gas dehydration units, and petroleum liquid storage tanks.

Each collection point is equipped with appropriate ducting and piping to route the fugitive gases to a central collection system, as illustrated in FIG. 2.

Compressor cylinder packings are a significant source of fugitive emissions in natural gas compression facilities. The system includes dedicated vents connected to the compressor cylinder packings to capture these emissions. These vents are designed to handle the high-pressure gas that may escape from the packing seals during normal operation. The captured gas from the compressor cylinder packings is typically rich in methane and other hydrocarbons, making it an ideal candidate for reuse as a supplementary fuel source.

Engine crankcases are another important collection point for fugitive emissions. The system incorporates crankcase vents that are specifically designed to capture the gases that accumulate in the engine crankcase during operation. These gases often contain a mixture of unburned fuel, oil vapors, and combustion byproducts. By capturing and routing these emissions back into the system, the preferred embodiment not only reduces environmental impact but also potentially improves engine efficiency by recirculating unburned fuel.

Instrumentation vents are integrated into the collection system to capture emissions from various control and measurement devices used throughout the facility. These instruments, which may use natural gas as a power source or for pneumatic control, can be a significant source of fugitive emissions. The collection system is designed to accommodate the intermittent and potentially low-volume nature of these emissions, ensuring that even small sources of fugitive gases are captured and utilized.

Gas dehydration units, which are used to remove water vapor from natural gas, can be a substantial source of methane and volatile organic compound (VOC) emissions. The preferred embodiment includes collection points specifically designed to capture emissions from these units. This may involve connecting to existing vent stacks or incorporating new collection piping to route these emissions into the central collection system.

Petroleum liquid storage tanks are also equipped with collection points in the preferred embodiment. These tanks can be a significant source of VOC emissions due to the evaporation of light hydrocarbons from the stored liquids. The collection system is designed to capture these vapors, which not only reduces emissions but also potentially recovers valuable product that would otherwise be lost to the atmosphere.

Each of these collection points is equipped with appropriate ducting and piping to route the fugitive gases to a central collection system. The ducting and piping are designed to handle the specific characteristics of the emissions from each source, such as pressure, temperature, and composition. The system may incorporate flow control devices, such as valves or regulators, to manage the flow of gases from each collection point. This ensures that the central collection system receives a balanced and controlled input of fugitive gases from all sources.

FIG. 3 presents a detailed cross-section of the filtration system. The collected fugitive gases pass through a coalescing filter designed to remove oil and other contaminants. This filtration process is crucial to ensure the quality of the gas before it is introduced into the engine air intake.

The filter is easily accessible for maintenance and replacement, featuring ball valves on either side to allow isolation without interrupting engine operation.

The preferred embodiment incorporates a sophisticated filtration system to process the collected fugitive gases before they are introduced into the engine air intake. At the heart of this system is a coalescing filter designed to remove oil and other contaminants from the gas stream.

The coalescing filter operates by forcing the gas stream through a series of fine mesh or fibrous materials. As the gas passes through these materials, oil droplets and other particulates collide with the filter media and coalesce into larger droplets. These larger droplets then fall to the bottom of the filter housing, where they can be collected and removed. This process effectively separates the liquid contaminants from the gas stream, resulting in a cleaner gas output.

The filtration process is crucial for several reasons. Firstly, it protects the engine from potential damage that could be caused by oil or other contaminants entering the combustion chamber. Secondly, it ensures that the quality of the gas being introduced into the engine air intake is consistent and suitable for efficient combustion. This is particularly important given the variable nature of the fugitive gases being collected from different sources within the facility.

The filter design in the preferred embodiment prioritizes ease of maintenance and system reliability. The filter housing is constructed to allow easy access for inspection, cleaning, and replacement of the filter elements. This design consideration ensures that regular maintenance can be performed quickly and efficiently, minimizing system downtime.

A key feature of the filtration system is the inclusion of ball valves on either side of the filter. These valves serve a critical function in the system's operation and maintenance. When both valves are open, the gas flows through the filter as part of the normal operation. However, when maintenance or replacement of the filter is required, these valves can be closed to isolate the filter from the rest of the system, for example to allow for replacement or maintenance of elements of the system such as the filter.

The ability to isolate the filter without interrupting engine operation is a significant advantage of this design. By closing the ball valves, maintenance personnel can safely remove and service the filter while the engine continues to operate using its primary fuel source. This feature enhances the overall system reliability and reduces potential downtime associated with filter maintenance or replacement.

Furthermore, the ball valve configuration allows for the installation of a bypass line, which can be used to route the gas flow around the filter in case of emergency or during filter change-out procedures. This additional redundancy ensures that the system can continue to operate even in the event of a filter blockage or during maintenance activities.

The filtration system also incorporates pressure monitoring devices before and after the filter. These devices help operators track the pressure drop across the filter, which is an indicator of filter efficiency and cleanliness. As the filter becomes loaded with contaminants, the pressure drop will increase, signaling the need for maintenance or replacement.

The control system in the preferred embodiment serves as the central intelligence unit, orchestrating the various components to ensure optimal performance and safety. FIG. 4 depicts this control system, which comprises several key elements working in concert in accordance with an embodiment.

At the heart of the control system is a programmable logic controller (PLC). The PLC is a digital computer designed for industrial applications, capable of executing complex control algorithms and processing inputs from multiple sources simultaneously. In this embodiment, the PLC is programmed to continuously monitor and adjust the system based on real-time data from various sensors throughout the installation.

Flow meters are integrated into the control system in an embodiment to measure the rate of gas flow at critical points in the system. These meters provide essential data on the volume of fugitive gases being captured and processed, as well as the flow rates into the engine air intake. This information is crucial for maintaining proper fuel-air ratios and optimizing engine performance.

Pressure sensors are strategically placed throughout the system to monitor gas pressures at various stages of the process. These sensors provide vital data on system operation, helping to detect potential issues such as blockages or leaks, and ensuring that gas pressures remain within safe operating limits.

Control valves, including the smart control valve in accordance with an embodiment, play a critical role in regulating gas flow and pressure. These valves receive commands from the PLC to adjust their positions, thereby controlling the flow of gases through the system. The smart control valve, in particular, is designed to maintain the desired pressure of the fugitive gases as they enter the engine, ensuring consistent and efficient fuel delivery.

The human-machine interface (HMI) serves as the primary point of interaction between operators and the control system. This interface displays real-time data on system performance, including engine speed, fuel flow rates, methane concentrations, and pressure readings. The HMI also allows operators to input commands and adjust system parameters as needed.

The PLC's continuous monitoring and adjustment capabilities are central to the system's effectiveness. It receives inputs from all sensors in real-time, processes this data according to its programmed logic, and sends appropriate control signals to the various actuators in the system, such as control valves. This constant feedback loop allows the system to respond quickly to changing conditions, maintaining optimal performance and safety.

The smart control valve, which in an embodiment comprises a configuration of a smart control valve as commonly known to be manufactured by Continental Controls is a key component in maintaining the desired pressure of the fugitive gases entering the engine. This valve incorporates its own pressure transmitter and control logic, allowing it to respond rapidly to pressure fluctuations. The valve maintains the pressure that is specified by the PLC, adjusting its position as needed to compensate for variations in gas flow or engine demand. This precise pressure control is crucial for ensuring stable and efficient engine operation when using the captured fugitive gases as a supplementary fuel source.

The preferred embodiment incorporates a comprehensive safety system to protect the engine and compressor from potential damage due to system failures or abnormal operating conditions. FIG. 5 illustrates these safety systems in accordance with an embodiment.

Primary and secondary pressure relief valves are key components of the safety system. The primary relief valve is set to activate at 5 psi, while the secondary valve is set at a higher threshold of 150 psi in accordance with an embodiment. This dual-valve configuration provides redundancy and ensures that the system remains protected even if one valve fails to operate. The primary valve acts as the first line of defense against overpressurization, relieving excess pressure before it reaches critical levels. If the primary valve fails or is unable to relieve pressure quickly enough, the secondary valve serves as a backup, preventing catastrophic failure.

Pressure transmitters are strategically placed throughout the system to detect and locate packing failures. These transmitters continuously monitor pressure at various points, particularly around compressor cylinder packings where leaks are most likely to occur. By comparing pressure readings from different locations, the control system can identify anomalies that may indicate a packing failure. This early detection capability allows for prompt intervention, preventing minor issues from escalating into major failures.

The system also incorporates automatic shutdown mechanisms triggered by high-pressure scenarios. These mechanisms are designed to rapidly halt system operation if pressure levels exceed predetermined safety thresholds. The shutdown process may involve closing valves to isolate high-pressure areas, stopping the compressor, and cutting fuel supply to the engine. This rapid response capability is crucial for preventing equipment damage and ensuring personnel safety in the event of a sudden pressure spike.

These safety features work in concert to protect the engine and compressor from potential damage. By continuously monitoring system pressures and providing multiple layers of protection against overpressurization, the safety system can effectively mitigate risks associated with system failures or abnormal operating conditions.

In the event of a compressor packing failure, for example, the safety system would respond in a coordinated manner. The pressure transmitters would detect the abnormal pressure increase, triggering an alarm to the control panel. This would allow the controller to initiate a controlled shutdown of the unit. Simultaneously, if the pressure continues to rise, the primary relief valve would activate to relieve the excess pressure. In the unlikely event that this is insufficient, the secondary relief valve provides an additional safeguard.

The automatic shutdown mechanisms are particularly important in scenarios where rapid intervention is necessary. For instance, if a sudden blockage in the system causes a rapid pressure increase, the shutdown system can react faster than human operators, potentially preventing catastrophic equipment failure.

By integrating these safety features, the preferred embodiment ensures robust protection against a wide range of potential failure modes. This comprehensive approach not only safeguards the expensive engine and compressor equipment but also contributes to the overall safety and reliability of the natural gas production facility.

An embodiment of the invention comprises a user interface, optionally comprising a human-machine interface. The human-machine interface (HMI) depicted in FIG. 6 serves as the primary point of interaction between operators and the control system, providing a comprehensive and user-friendly interface for monitoring and controlling the Engine and Compressor Vent Gas Mitigation System.

The HMI displays real-time data on system performance through a series of digital readouts, graphs, and visual indicators. Key performance metrics shown on the interface in accordance with an embodiment include one or more of the following:

Engine speed: A digital readout displays the current RPM of the engine, allowing operators to monitor its operational status and ensure it remains within optimal parameters.

Fuel flow rates: The interface presents both the flow rate of the primary natural gas fuel and the supplementary fugitive gas fuel. This information is crucial for operators to understand the proportion of fugitive gases being utilized and the overall fuel consumption of the engine.

Methane concentrations: The HMI provides readings of methane concentrations at various points in the system, including the compressor vent, engine crankcase vent, and engine exhaust. These measurements are essential for monitoring the effectiveness of the fugitive gas capture system and ensuring that methane emissions are being properly managed.

Pressure readings: The interface displays pressure data from multiple sensors throughout the system, including the compressor vent pressure, crankcase pressure, and engine air inlet pressure. These readings help operators identify potential issues such as blockages or leaks in the system.

Calculated greenhouse gas metrics: The HMI processes data from various sensors to provide real-time calculations of greenhouse gas emissions. This may include metrics such as CO2 equivalent emissions per hour, allowing operators to track the system's environmental impact continuously.

The user interface in accordance with the preferred embodiment is designed with a user-friendly layout, utilizing color-coded indicators and graphical representations to make data interpretation intuitive and efficient. For example, pressure readings might be displayed on gauge-style indicators, while fuel flow rates could be represented by dynamic bar graphs.

In addition to displaying data, the HMI allows operators to input commands and adjust system parameters. This may include features such as one or more of the following:

Control valve adjustment: Operators can fine-tune the position of control valves to optimize the flow of fugitive gases into the engine air intake.

Alarm settings: The interface allows for the configuration of alarm thresholds for various parameters, ensuring that operators are promptly alerted to any abnormal conditions.

Data logging controls: Operators can initiate or adjust data logging settings, enabling comprehensive record-keeping for regulatory compliance and performance analysis.

By providing this real-time information and control capabilities, the HMI empowers operators to make informed decisions that optimize system performance and reduce emissions. For instance, if the interface indicates an increase in methane concentration in the engine exhaust, operators can adjust the air-fuel ratio to ensure more complete combustion. Similarly, if pressure readings suggest a potential blockage in the filtration system, operators can initiate maintenance procedures before the issue affects overall system performance.

The HMI also plays a crucial role in emissions reduction by allowing operators to monitor and fine-tune the system's performance continuously. By providing real-time greenhouse gas metrics, the interface enables operators to assess the immediate impact of their control decisions on emissions levels. This immediate feedback loop facilitates a proactive approach to emissions management, allowing for rapid adjustments to maintain optimal environmental performance.

Furthermore, the data presented on the HMI can be used for long-term performance analysis and optimization. The system's ability to log data over time allows for the identification of trends and patterns in engine performance and emissions levels. This historical data can inform maintenance schedules, guide system upgrades, and support continuous improvement efforts to further reduce emissions and enhance operational efficiency.

The data logging system 170 in accordance with an embodiment is designed to capture and record information at a high frequency, logging data on a per-second basis through data collection sensors 171 positioned throughout the system. This granular approach to data collection provides an exceptionally detailed record of all process and operating parameters within the system. By capturing data at such frequent intervals through the sensors 171, the system can accurately track rapid changes in operating conditions, allowing for precise analysis of system performance and emissions output.

The data processing unit 172 in accordance with an embodiment handles various types of data, including engine speed, fuel flow rates (both for the primary natural gas fuel and the supplementary fugitive gas), methane concentrations at various points in the system, pressure readings from multiple sensors, and calculated greenhouse gas metrics. This comprehensive data set processed by unit 172 provides a complete picture of the system's operation and environmental impact.

One of the key features of the data storage system 173 in accordance with an embodiment is its ability to export data in a widely compatible format. The system generates a.csv (comma-separated values) file for each calendar day, containing all the logged data from sensors 171. This file format is chosen for its versatility and ease of use with various analysis tools and software packages. The daily export feature allows for convenient segmentation of data, facilitating both short-term operational analysis and long-term trend identification.

The exportable nature of the data from storage system 173 in accordance with an embodiment is particularly valuable for regulatory compliance purposes. Many environmental regulations require detailed reporting of emissions and operational data. By providing easily accessible and comprehensive data files, the system simplifies the process of generating required reports for regulatory bodies. This feature can significantly reduce the administrative burden associated with compliance reporting.

For performance optimization, the detailed data logs stored in system 173 in accordance with an embodiment enable engineers and operators to conduct in-depth analysis of system behavior. By examining trends and correlations in the data collected by sensors 171 and processed by unit 172, they can identify opportunities for improving efficiency, reducing emissions, or enhancing overall system performance. The high-frequency data collection allows for the detection of subtle patterns or brief anomalies that might be missed with less frequent logging.

In terms of emissions tracking, the system's ability to log calculated greenhouse gas metrics through sensors 171 in accordance with an embodiment on a per-second basis provides an unprecedented level of detail in emissions monitoring. This granular data allows for precise quantification of the system's environmental impact and can be used to demonstrate the effectiveness of the fugitive gas capture and utilization process. It also enables rapid detection of any unexpected increases in emissions, allowing for prompt corrective action.

The combination of comprehensive data collection through sensors 171, processing through unit 172, and storage in system 173 makes this system in accordance with an embodiment a powerful tool for ongoing system management and improvement. It provides the foundation for data-driven decision-making, enabling operators to fine-tune system parameters based on empirical evidence rather than estimation or intuition.

FIG. 8 provides a detailed illustration of how an embodiment of the system in accordance with an embodiment integrates with an existing engine and compressor setup in a typical industrial environment. This diagram serves to highlight the system's adaptability and ease of installation across various facility configurations.

The diagram demonstrates how the system can be retrofitted to existing equipment without requiring significant modifications to the core engine and compressor infrastructure. It shows the strategic placement of collection points for fugitive gases, including connections to compressor cylinder packings, engine crankcases, instrumentation vents, and other potential emission sources.

The integration diagram illustrates the routing of collected fugitive gases through the filtration system, which is positioned to allow easy access for maintenance while minimizing disruption to existing operations. The placement of control valves and safety devices is shown in relation to the engine and compressor, emphasizing how these components can be incorporated without interfering with normal equipment function.

FIG. 8 also depicts the connection points where the processed fugitive gases are introduced into the engine's air intake system. This visualization helps to demonstrate how the system can utilize existing air intake infrastructure with minimal modifications, further emphasizing its adaptability.

The diagram includes representations of the control system components, such as the PLC and HMI, showing how these can be positioned for optimal operator access and system monitoring. This layout consideration underscores the system's focus on user-friendly operation and seamless integration into existing control environments.

By providing a visual representation of the system's integration, FIG. 8 illustrates the flexibility of the design to accommodate various facility layouts and equipment configurations. This adaptability is crucial for the system's practical implementation across a wide range of natural gas production facilities, each with its unique spatial constraints and operational requirements.

The preferred embodiment addresses several key regulatory requirements related to methane emissions and greenhouse gas reduction in the oil and gas industry. Specifically, the system is designed to comply with regulations such as NSPS OOOO b/c and the Methane Emission Reduction Program (MERP), which place limits on methane emissions and impose costs on excess emissions.

The system's comprehensive approach to capturing fugitive gases from multiple sources within a natural gas production facility directly addresses the regulatory caps on venting natural gas. By collecting emissions from compressor cylinder packings, engine crankcases, instrumentation vents, gas dehydration units, and petroleum liquid storage tanks, the system helps facilities stay within the allowed venting limits, such as the two standard cubic feet per minute per compressor throw.

The data logging and reporting capabilities of the system play a crucial role in regulatory compliance. The system logs data on a per-second basis, providing detailed information on all process and operating parameters. This granular data collection allows for precise quantification of emissions, which is essential for demonstrating compliance with regulatory limits. The ability to easily export this data as daily .csv files facilitates efficient reporting to regulatory bodies, reducing the administrative burden associated with compliance reporting.

Furthermore, the system's real-time monitoring and control capabilities enable operators to quickly identify and address any deviations from regulatory limits. The human-machine interface (HMI) provides continuous updates on methane concentrations and calculated greenhouse gas metrics, allowing for immediate corrective action if emissions approach regulatory thresholds.

The system's ability to capture and utilize fugitive gases as a supplementary fuel source not only reduces emissions but also aligns with regulatory goals of improving energy efficiency and reducing waste. This dual benefit of emissions reduction and energy recovery demonstrates a proactive approach to meeting and exceeding regulatory requirements.

By providing accurate, real-time measurement of vented emissions, the system addresses a key regulatory concern regarding the quantification and reporting of greenhouse gas emissions. This capability is particularly relevant in the context of regulations like the Waste Emissions Charge (WEC) under the Inflation Reduction Act, which imposes fees on excess methane emissions.

The Waste Emissions Charge (WEC) under the Inflation Reduction Act represents a significant regulatory measure aimed at reducing methane emissions in the oil and gas industry. This charge imposes escalating fees on excess methane emissions, creating a strong financial incentive for companies to minimize their emissions. Specifically, the WEC is set to increase from $900 per metric ton of methane in 2024 to $1,200 per metric ton in 2025, and further to $1,500 per metric ton in 2026.

The system's capability to accurately measure and report fugitive gas emissions is crucial in this regulatory context. By providing precise, real-time data on methane emissions, the system enables operators to closely monitor their emission levels and take proactive measures to stay below the thresholds that would trigger these fees. This not only helps companies avoid significant financial penalties but also aligns their operations with the broader policy goal of reducing greenhouse gas emissions. Furthermore, the detailed data logging and reporting features of the system can provide the documentation necessary to demonstrate compliance with WEC regulations, potentially saving companies substantial amounts in avoided fees while contributing to national emission reduction targets.

The preferred embodiment offers several key benefits that make it a comprehensive solution for capturing, processing, and utilizing fugitive combustible gases in natural gas production facilities. These benefits collectively contribute to improved environmental performance, operational efficiency, and regulatory compliance.

Firstly, the system significantly reduces greenhouse gas emissions by capturing and utilizing fugitive gases that would otherwise be released into the atmosphere. This not only mitigates the environmental impact of natural gas production but also aligns with increasingly stringent regulations on methane emissions. The system's ability to convert these captured gases into a supplementary fuel source for the engine represents a dual benefit of emissions reduction and energy efficiency.

Secondly, the system's adaptability and ease of integration with existing equipment make it a practical solution for a wide range of facility configurations. As demonstrated in FIG. 8, the system can be retrofitted to existing engine and compressor setups with minimal disruption to ongoing operations. This flexibility ensures that the benefits of fugitive gas capture can be realized across diverse industrial environments.

Thirdly, the comprehensive control and monitoring capabilities provided by the PLC and HMI allow for precise management of the system. Real-time data on system performance, including engine speed, fuel flow rates, and methane concentrations, enables operators to make informed decisions that optimize performance and further reduce emissions. This level of control contributes to improved overall operational efficiency.

Fourthly, the robust safety features incorporated into the system, including pressure relief valves and automatic shutdown mechanisms, ensure protection against potential equipment damage due to system failures or abnormal operating conditions. This enhances the reliability and longevity of both the fugitive gas capture system and the existing engine and compressor equipment.

Finally, the detailed data logging and reporting capabilities of the system provide significant advantages for regulatory compliance and performance optimization. The ability to generate comprehensive, easily exportable data files facilitates efficient reporting to regulatory bodies and enables in-depth analysis for continuous system improvement.

The preferred embodiment of the invention represents a holistic approach to addressing the challenges of fugitive gas emissions in natural gas production facilities. By combining effective emissions capture, energy efficiency improvements, advanced control and monitoring capabilities, robust safety features, and comprehensive data management, the system offers a solution that is both environmentally responsible and operationally beneficial.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

I claim:

1. A system for capturing and utilizing fugitive combustible gases, comprising:

a) a plurality of collection points configured to capture fugitive gases from multiple sources in a natural gas production facility;

b) a filtration system configured to remove contaminants from the captured fugitive gases;

c) a control valve configured to regulate flow of the filtered fugitive gases;

d) a programmable logic controller (PLC) configured to monitor and control the system;

e) an engine air intake system comprising a dynamic mixing nozzle configured to receive and mix the filtered fugitive gases as a supplementary fuel source with incoming air;

f) a data logging system configured to record operational parameters and emissions data;

g) a regulatory compliance module configured to:

calculate methane emissions reduction based on the captured fugitive gases;

generate compliance reports for environmental regulations including NSPS OOOO b/c and MERP requirements; and track emissions data for Waste Emissions Charge (WEC) calculations; and h) a real-time monitoring interface configured to:

display calculated greenhouse gas metrics;

provide emissions tracking data; and enable adjustment of system parameters based on emissions data.

2. The system of claim 1, wherein the multiple sources include compressor cylinder packings, engine crankcases, instrumentation vents, gas dehydration units, and petroleum liquid storage tanks.

3. The system of claim 1, further comprising a human-machine interface (HMI) configured to display real-time system performance data and allow operator control of the system.

4. The system of claim 1, further comprising primary and secondary pressure relief valves configured to prevent overpressurization of the system.

5. The system of claim 1, further comprising pressure transmitters configured to detect packing failures in the natural gas production facility.

6. The system of claim 1, wherein the PLC is configured to initiate an automatic shutdown of the system in response to detected abnormal operating conditions.

7. The system of claim 1, wherein the data logging system is configured to generate daily exportable data files for regulatory compliance reporting.

8. A method for capturing and utilizing fugitive combustible gases in a natural gas production facility, comprising:

a) capturing fugitive gases from multiple sources within the facility;

b) filtering the captured fugitive gases to remove contaminants;

c) monitoring flow rates and pressures of the filtered fugitive gases;

d) introducing the filtered fugitive gases into an engine air intake system as a supplementary fuel source;

e) continuously monitoring engine parameters and emissions data;

f) logging operational data for regulatory compliance and system optimization g) calculating methane emissions reduction based on the captured fugitive gases;

h) generating compliance reports for environmental regulations including NSPS OOOO b/c and MERP requirements; and i) tracking emissions data for Waste Emissions Charge (WEC) calculations.

9. The method of claim 8, further comprising displaying real-time system performance data on a human-machine interface (HMI).

10. The method of claim 8, further comprising automatically adjusting the flow of filtered fugitive gases in response to changes in engine performance or emissions data.

11. The method of claim 8, further comprising initiating an automatic system shutdown in response to detected abnormal operating conditions.

12. The method of claim 8, further comprising generating daily exportable data files containing logged operational data and emissions information.

13. A control system for managing fugitive combustible gases in a natural gas production facility, comprising:

a) a programmable logic controller (PLC) configured to monitor and control the flow of captured fugitive gases;

b) a human-machine interface (HMI) configured to display real-time system performance data and allow operator control;

c) a plurality of sensors configured to measure gas flow rates, pressures, and engine parameters;

d) a control valve configured to regulate the flow of fugitive gases into an engine air intake system;

e) a data logging system configured to record operational parameters and emissions data;

f) a compliance tracking module configured to:

monitor methane emissions in accordance with regulatory thresholds;

calculate emissions reduction credits; and generate regulatory compliance reports; and g) an environmental impact calculation system configured to:

quantify greenhouse gas reductions from captured gases;

track emissions data for regulatory fee calculations; and generate exportable compliance documentation.

14. The control system of claim 13, wherein the PLC is configured to automatically adjust the control valve in response to changes in engine performance or emissions data.

15. The control system of claim 13, wherein the data logging system is configured to generate daily exportable data files for regulatory compliance reporting.

16. A system for capturing and utilizing fugitive combustible gases, comprising:

a) a plurality of collection points configured to capture fugitive gases;

b) a programmable logic controller (PLC) configured to:

monitor real-time gas flow rates and pressures;

calculate greenhouse gas metrics; and adjust system parameters based on emissions data;

c) a data logging system configured to:

record operational parameters at per-second intervals;

generate daily exportable data files; and track methane emissions for regulatory compliance; and d) a regulatory compliance module configured to:

monitor compliance with NSPS OOOO b/c emission limits;

calculate Waste Emissions Charge (WEC) fees; and generate documentation for environmental regulations.

* * * * *